United States Patent
Yanosy

(10) Patent No.: US 6,978,463 B2
(45) Date of Patent: Dec. 20, 2005

(54) PROGRAMMATIC UNIVERSAL POLICY BASED SOFTWARE COMPONENT SYSTEM FOR SOFTWARE COMPONENT FRAMEWORK

(75) Inventor: John Anthony Yanosy, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 717 days.

(21) Appl. No.: 10/128,077

(22) Filed: Apr. 23, 2002

(65) Prior Publication Data

US 2003/0200357 A1 Oct. 23, 2003

(51) Int. Cl.⁷ .............................. G06F 9/44; G06F 9/46
(52) U.S. Cl. ........................ 719/318; 719/328; 707/1; 717/120; 717/121; 717/125
(58) Field of Search ................................ 719/318–328; 707/1, 10; 717/124–131, 120–121, 123; 709/223–225

(56) References Cited

U.S. PATENT DOCUMENTS 6,792,456 B1 * 9/2004 Hellerstein et al. ......... 709/224
6,820,121 B1 * 11/2004 Callis et al. ................. 709/225
2003/0041139 A1 * 2/2003 Beadles et al. ............. 709/223

* cited by examiner

Primary Examiner—Majid Banankhah
(74) Attorney, Agent, or Firm—Charles W. Bethards

(57) ABSTRACT

A policy based software component system (24) for modifying software component behavior includes an interceptor (34) for intercepting an interface event being transmitted from a software application (14) comprising software components (20, 22). A rules database (32, 40) stores software component modifying rules, and an adaptor (35) modifies the interface event based on the software component modifying rules stored in the rules database (32, 40). A policy engine (36) attempts to match the interface event with the software component modifying rules stored in the rules database (32, 40), and subsequently coordinates the modification of the interface event by the adaptor (35) when the policy engine (36) matches the interface event with at least one of the software component modifying rules stored in the rules database (32, 40).

19 Claims, 2 Drawing Sheets

PROGRAMMATIC UNIVERSAL POLICY BASED SOFTWARE COMPONENT SYSTEM FOR SOFTWARE COMPONENT FRAMEWORK

BACKGROUND OF THE INVENTION

1. Field of the Invention

The present invention relates to software component design and development, and specifically to a software component framework that enables programmatic influence of software component behavior.

2. Description of Related Art

Conventional approaches to component based software development dictate that a software application is created through development, integration, and installation of one or more underlying software components. Each software component, once installed, provides the other software components with the ability to access its functional capability through a well-specified interface, known as an Application Platform Interface (API). The software component receives requests, known as function calls, through this API, and in response provides access to its internal software component operations. The software component responds to function calls according to the programmatic functional behavior associated with the specific function call or calls defined within and supported by its API.

However, such conventional approaches do not provide much programmatic flexibility regarding use of the software components once the components are installed into the application system, as the components typically provide only a single service access API for reuse by other software applications and also conform only to applicable platform or middleware interfaces for compatible runtime operation. Therefore, once the software components are installed or integrated into the system runtime platform, the behavior of the component API cannot be modified or constrained in any manner.

Therefore, what is needed is a system and method that is capable of enabling modification of software component behavior at a component's API even after installation of the component.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
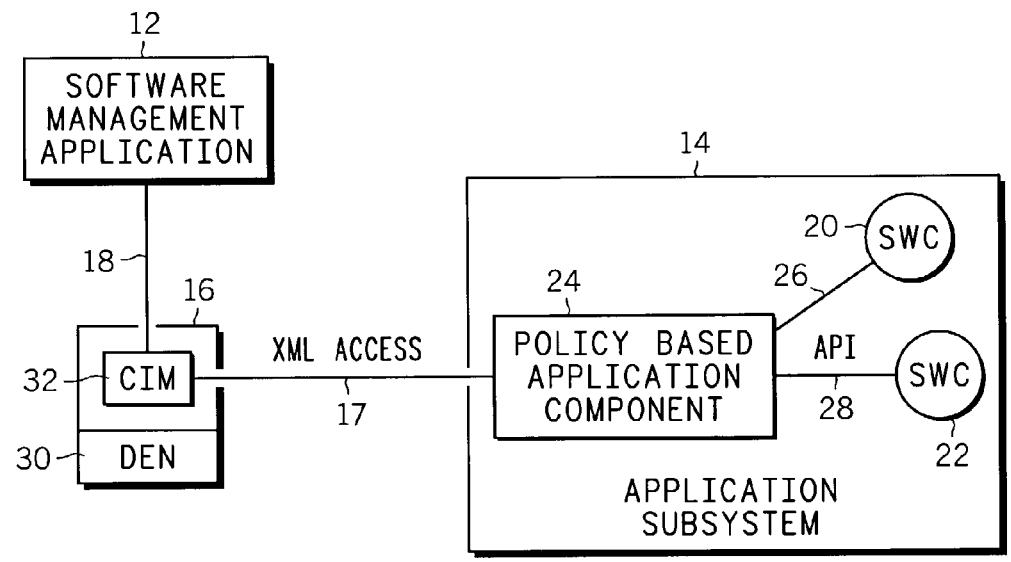
FIG. 1 is a block diagram of an exemplary software application framework including a policy based component according to the present invention.

Referring now to the drawings in which like numerals reference like parts, FIG. 1 shows an exemplary software application framework 10. The software application framework 10 enables one or more software framework management applications, such as the exemplary software management application (software application) 12, to affect the operational behavior of one or more application subsystems, such as the exemplary software application subsystem (application subsystem) 14, through communications with a management application server 16, which is also in communication with the application subsystem 14 and the software application 12 via application interfaces 17, 18, respectively. The structure and operation of each of these elements of the software application framework 10 will be discussed below in more detail.

The application subsystem 14 may be any application such as, for example, a software component based product or subsystem, application middleware, or an application development tool, defined by one or more legacy software components, such as exemplary software components 20, 22, which are not policy based, and a policy based application software component 24. Regardless of its specific type, the application subsystem 14 is one in which a system integrator or, in the telecommunications area, a service provider, wishes to have the ability to constrain or modify its behavior, or to reuse an underlying software component, without having to recompile the software component or without having to add a programmatic layer or wrapper around the component as is known in the art. As will be discussed below in more detail, the software application framework 10 provides significant design advantages and run time flexibility to developers of the application subsystem 14 by enabling the developers to have more control over third party software components.

While the application subsystem 14 includes non-policy based software components 20, 22 and the policy based component 24, its configuration is exemplary only, as other configurations are possible. For example, all software components may be policy based components such as the policy based component 24. Alternatively, any combination of policy based and non-policy based software components may also be used to configure the application subsystem 14 depending upon the particular software application being implemented. In addition, the functional dependencies of the software components 20, 22, represented by APIs 26, 28, are also exemplary, with other interconnection configurations being possible.

The software management application 12 provides the application subsystem 14 with programmatic policy based functional capabilities by enabling policies in the management application server 16 that affect the operational behavior of the policy based component 24 in response to function calls, referred to generally as interface events, across one or both of the APIs 26, 28. The software management application 12 communicates with the management application server 16 across the interface 18 for the purpose of modifying or adding policy rules associated with policy based components, such as the policy based component 24, within one or more application subsystems, such as the application subsystem 14. Such a configuration is exemplary only and is not limited to usage of central policy rule storage systems such as the management application server 16, but also may be realized using a configuration in which one or more policy rule storage systems could be associated with the platforms hosting the application subsystem 14.

Policy information associated with the policy based component 24 is accessed from the application server 16 through the application interface 17. The software components, such as the exemplary software components 20, 22 and the policy based component 24, may be programmed in a variety of languages for different middleware platforms such as, for example, C, CORBA, Visual BASIC, or JAVA. However, for purposes of the present invention, the software components 20, 22, and the policy based component 24 may be programmed in any computer language that supports component based software implementations. While these elements will be referred to throughout as software components, one skilled in the art will appreciate that the software components 20, 22 and the policy based component 24 may also be software objects or other like elements used to compile and create a software application and that may be re-used by developers for one or more alternative applications. In the case of FIG. 1, software components 20, 22 have access to the functions of the policy based component 24 through the API 26, 28 that is offered to other components by the policy based component 24. Though each of the software components 20, 22 and the policy based component 24 may include several subprograms individually defined by a name and selectively activated in response to an interface event, the exemplary configuration of FIG. 1 illustrates the situation where software components 20, 22 can call a subprogram offered by the policy based component 24 by its name through the API 26, 28, respectively.

The policy based component 24 of the application subsystem 14 may be compiled during development of the software components 20, 22,. The policy based component 24 is capable of accessing stored policy rule sets, referred to also as software component behavior modifying rules or rule sets, in the management application server 16 through the interface 17 to modify the behavior of the application subsystem 14 when appropriate. However, the policy based component 24 may also be retrofitted with a set of detailed action based rules 40 as illustrated in FIG. 2.

The management application server 16, also referred to as a policy storage server, includes a directory-enabled network (DEN) 30 that may store XML, RDF or other semantic format type policy documents in a directory mediated by a defined common information model (CIM) 32 (XML formatted policy documents will be referred to for purposes of discussion). In other words, the CIM 32, which is preferably realized by any commercial database technology with XML type access, specifies policies that are appropriate for one or more policy based components. The policy based component 24 is capable of accessing these XML formatted policy documents through the CIM 32 and across the application interface 17 based on, for example, a Lightweight Directory Assistance protocol. Other protocols for accessing the CIM policy information can be used, consistent with the ability to access and transport the policy information to the policy based component 24.

Figure 2:
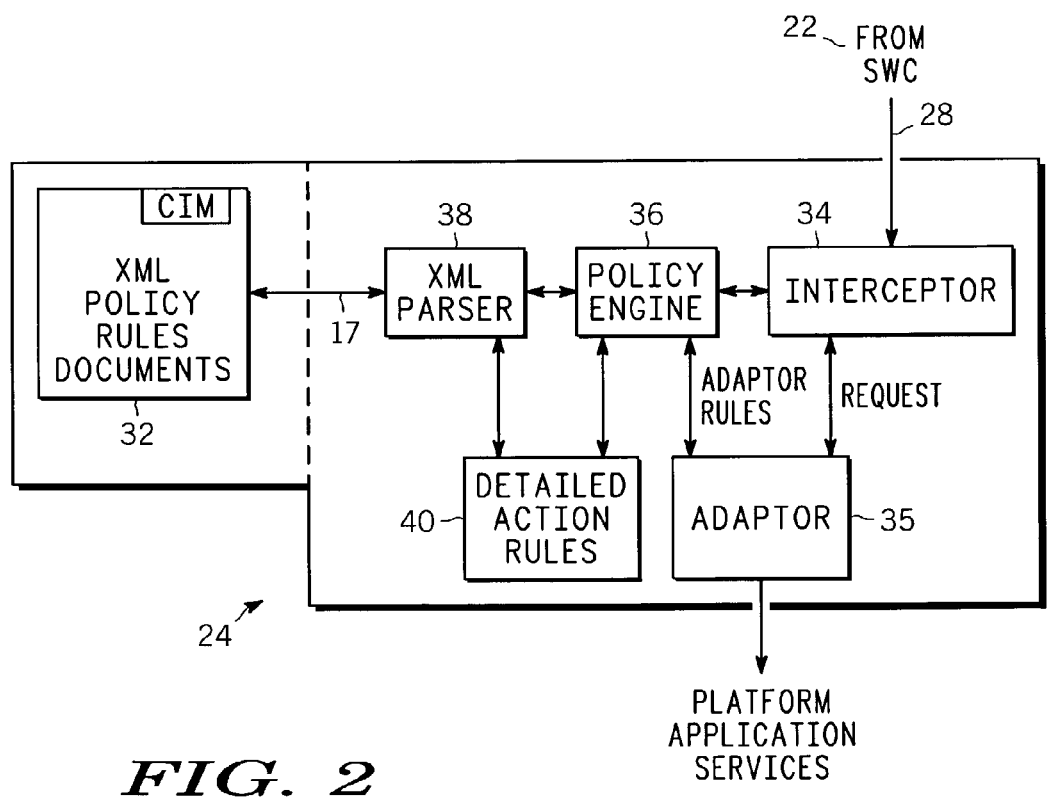
FIG. 2 is a more detailed block diagram showing the policy based component according to the present invention.

FIG. 2 shows a typical configuration of the policy based component 24 in detail. A selector, referred to hereinafter as an interceptor, 34 is for intercepting an interface event such as a function call transmitted from, for example, the software components 22 via the application platform interface (API) 28 and also is for informing the software components 22 that the behavior of a software component correlated with an intercepted interface event has been adapted/modified/constrained. An adaptor 35 is for performing any actual adaptation/modification/constraint imposed on the software component based on instructions communicated from a policy engine 36, including calling on external services, such as API services of another software component or middleware (not shown) to extend software component functionality if so instructed.

In addition to instructing the adaptor 35 as to what actions to take in response to the interface event, the policy engine 36 is also for first processing the interface event by instructing a parser, such as an XML parser, 38 to search policy rules, such as XML policy rules documents, contained in the CIM 32, to determine if any of the stored policy rules match with the interface event (an event match). As shown, these policy rules are documents that are stored externally from the policy based component 24 at the CIM 32; however, the policy rules documents may also be stored in an XML database located in the policy based component 24 itself. The parser 38 is for determining whether an event match exists by searching the respective start and end tags of the stored XML policy rules, as such tags are related to the associated function calls, and for subsequently informing the policy engine 36 of the results of the search.

If the parser 38 determines that a match does exist between at least one stored policy rule and the interface event, it notifies the policy engine 36 of the event match and also transmits details of the event match to the detailed action rules database 40. As with the XML policy rules, the detailed action rules may be located externally from, or within, the policy based component 24, depending upon specific network design parameters. However, for purposes of illustration and discussion, the detailed action rules database 40 is shown as being located within the policy based component 24. The rules located within the detailed action rules database 40 atomically define actions to be taken by the interceptor 34 and the adaptor 35 as a result of the event match. For example, if an XML policy rule defines "For this function call, do X," a corresponding detailed action rule might specifically define X.

At this point it should be noted that either the XML policy rules or the detailed action rules may be revised in order to revise how the policy based software component 24, and therefore interface events, are modified/constrained/adapted. Obviously the software components 20, 22 are also affected by the changes in behavior of the policy based component 24. This feature of the policy based component 24 enables software components to be adapted to changing application requirements or to be later re-used in an application wholly or partially unrelated to the original application in which the software component is compiled. Specifically, an XML policy rule may be modified so that it corresponds to a new set of detailed action rules. Likewise, the atomic instructions of a detailed action rule may be modified so that it and/or its associated rule set provides different atomic instructions to a same or new associated XML policy rule. Therefore, a software developer has a high degree of control over the granularity of interface event/software component modification and can control the granularity of such modifications by modifying either, or both, the XML policy rules and the detailed action rules.

Still referring to FIG. 2, operation of the policy based component 24 with respect to its modification of an intercepted interface event based on the XML and detailed action rules will be more specifically discussed. The policy engine 36 responds to a stream of external stimuli of various kinds from various sources received as interface events across interfaces to which the policy engine is in communication, such as the API 28 for application software and the interface 17 for policy rule access and policy based component management functions. The external stimuli may include requests for service from applications and management requests and or stimuli from event policy matching. Each interface event includes an event type plus additional information describing the event. For example, an application service request interface event may include: a unique event type identifier for application service requests; a unique identifier for the service being requested; service request arguments; the identity and address of the requestor together with the requestor's security credentials; the identity of the subscriber for whom the request is made, including subscriber credentials; and relevant context information such as, for example, the status of the request, e.g., initial, repeat request, terminate. Other types of interface events will also include the appropriate event type identifier plus additional descriptive information, with the specific information varying based on the event type. Other candidate interface event types to which the above-discussed rule sets may be matched by the parser 38 may include: management requests; application callbacks; management callback; environmental events; and scheduled events.

The policy engine 36 applies policy rules to an interface event intercepted by the interceptor 34 to determine a response. These policy rules are organized into rule sets, each of which contains rules relevant to a particular type of interface event or context, and each of which is associated with a corresponding type of interface event. For example, when an interface event of type T is received, the XML parser 38 matches the interface event with the XML rule set corresponding to T at the CIM 32 and a corresponding detailed action rule set at the detailed action rules database 40, and informs the policy engine 36 of the event match. The policy engine 36 then applies the XML and detailed action rules sets corresponding to T to the interface event to determine the appropriate action(s) for the adaptor 35 to take based upon the information contents of the interface event. The adaptor 35 then takes the appropriate action(s) as discussed above and instructs the interceptor 34 as to what response to send back to the corresponding software component.

It should be noted that, prior to application of the rule set corresponding to the interface event of type T, other rule sets may also be applied to the interface event to handle decisions having to do with aspects of the interface event that are independent of the event type and that are at a higher level of abstraction. One example of such an aspect is application of business rules, such as requirements for authentication of the requesting software component, requirements for negating all requests from a specific software component source regardless of event type, and the like. Rules in rule sets may specify additional rule sets to be invoked to analyze interface events and to determine appropriate behavior. This additional rule set feature provides the opportunity for behavior sharing and reuse among interface event types and also provides a mechanism by which a first level rule set may be used to determine which of several alternative second level rule sets is relevant to a particular interface event. Use of additional rule sets may be used to select relevant business rules, as well as to choose the rule set appropriate for interface events of type T as described above. For example, requestor and subscriber validation in connection with a service request type interface event are examples of shared behavior factored into a separate, shared rule set.

In addition, rule sets applicable to different contexts or at different levels of abstraction may differ in the interface event information that may be referenced in conditions, and the atomic actions included in action sequences. Additionally, it may be appropriate to provide different tools to support creation and maintenance of different kinds of rule sets such as, for example, end user policy preferences, application developer preferences, service provider policies, and the like.

Each of the above discussed XML and detailed action rules consist of a condition and an action sequence. A rule is applied to an event, which consists of an event type plus additional descriptive information. A rule condition is an encoding of a Boolean function of the contents of an event; i.e., the condition evaluates to true or false for a particular event. If a rule condition evaluates to true for an event, it "fires" and its action sequence, which consists of one or more atomic actions, is executed. As discussed above, the atomic actions are stored in the detailed action rules database 40 and are defined and realized either internally within or externally from the policy engine 36.

The policy engine 36 provides additional atomic actions internally, including invoking a rule set (presumably different from the one currently active), and updating the contents of an interface event, presumably to affect decisions by other rules. There may be restrictions on updating the contents of an interface event. For example, information provided externally to the policy engine 36 may be protected from overwriting.

Figure 3:
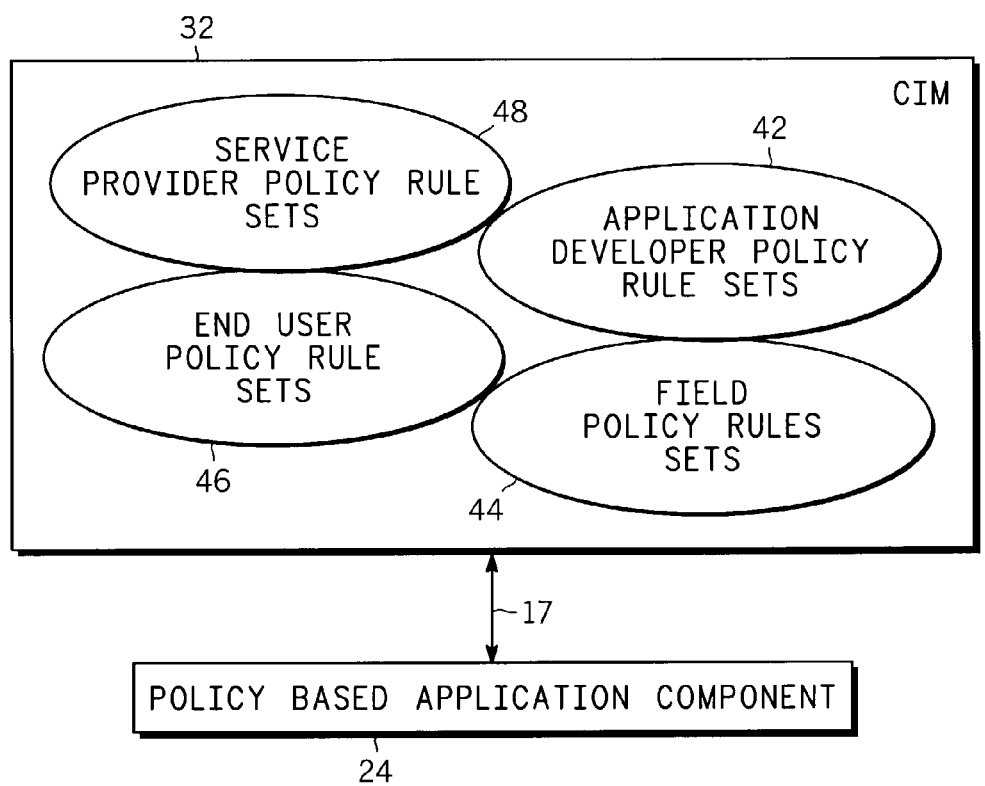
FIG. 3 is a block diagram illustrating exemplary policies that may be associated with the policy based component to modify component behavior according to the present invention.

As shown in FIG. 3, policy rule sets stored either within, or externally from, the policy based component 24 in both the CIM 32 and the detailed action rules database 40 as discussed above may include, for example, application developer policy rule sets 42, field policy rule sets 44, end user policy rule sets 46, and service provider policy rule sets 48. The application developer policy rule sets 42 are specified by application designers and contain rules directed to software application operation details. Certain of the application developer policy rule sets 42 may be common to several software applications, while others may override and/or add to common rules for a specific use of a policy based application component 24 as shown or exemplified by the software application 14. The field policy rule sets 44 add to and override the application developer policy rule sets 42 to adjust, in the example of a telecommunications service provider, the rules to the service provider's configuration and business needs. Such field policy rule sets 44 are typically specified by field engineers and/or by service provider personnel during software component installation. The end user policy rule sets 46 adapt application behavior to the needs of application users and/or subscribers and are specified by the users/subscribers themselves. The service provider policy rule sets 48 further add to and override the other policy rule sets and are for changing and sometimes temporarily reconfiguring software components in response to conditions not adequately anticipated by the above policy rule sets.

Each of the above rule sets 42–48 is constrained to limit its effect according to the authority and legitimate need of the above-mentioned respective entities. The actual constraints will be determined according to each specific application implementation.

Rules from the above-discussed rule sets 42–48 may be applied by the adaptor 35 and the policy engine 36 at different stages in the lifecycle of the application subsystem 14 or software policy based component 24. Some rule sets and their contained rules are to be applied at application run time. Such rule sets enable late binding and flexibility, and allow the software components 20, 22, and 24 to be combined and used in ways unforeseen before the application subsystem 14 is actually used. For example, run time rules can enable a software component that needs a service to find the best fit among those available in its environment. Some rule sets and their contained rules are to be applied at build time; make or build files (which are well known and of the type that originated in the UNIX environment) are a simple example of such rules. These types of rule sets can alleviate the need to predict how a software component will be configured before it is compiled.

Still other rule sets and their contained rules are to be applied by the adaptor 35 and the policy engine 36 at compile or interpretation time. Such rules may be used to adapt source software to any of several alternative environments that differ in ways somehow relevant to the software component in question. Historically, preprocessor constructs intermixed with source code, and sometimes combined with make or build files, are a precursor to such rules. In some environments, the metadata that are associated with the preprocessed code could contain and/or influence the rules.

Some rule sets and their contained rules might be applied at code generation time. Such rules would select suppliers of conforming interfaces to provide desired services, and otherwise direct the code generation. Further, some rule sets and their contained rules might be applied at design time. Such rules would decide which set of reusable components should be exported via a facade to make them publicly accessible.

In accordance with the present invention, any of the above categories of rules may be created any time in the software life cycle upstream of their use. However, considering that a primary reason for using rules is increasing flexibility and delaying binding, it is expected that rules typically will be created close to but of course before the life cycle stage at which they are needed. Also, it should be noted that the software application framework 10 may be such that rules applied at different software lifecycle stages can be folded into a construction in which the rules are applicable only at run-time.

While the above description is of the preferred embodiment of the present invention, it should be appreciated that the invention may be modified, altered, or varied without deviating from the scope and fair meaning of the following claims.

What is claimed is:

1. A policy based software component system for modifying software component behavior, comprising:
   a policy based software component;
   an interceptor for intercepting an interface event being transmitted from a software component to the policy based software component;
   a rules database for storing software component behavior modifying rules;
   an adaptor for modifying behavior of the software component based on the software component behavior modifying rules stored in the rules database; and
   a policy engine for attempting to match the interface event with the software component behavior modifying rules stored in the rules database, and for subsequently coordinating the modifying of the behavior of the software component by the adaptor when the interface event is matched with at least one of the software component behavior modifying rules stored in the rules database.

2. The system of claim 1, wherein the interceptor is further for indicating to the software component that the interface event has been modified by the adaptor; and the policy engine is further for coordinating the indicating to the software component by the interceptor that the interface event has been modified by the adaptor.

3. The system of claim 1, wherein the rules database comprises a semantic format rules database for storing software component behavior modifying rules.

4. The system of claim 3, further comprising a parser located between the semantic format rules database and the policy engine for parsing the semantic format software component behavior modifying rules stored in the semantic format rules database to match the interface event with the software component behavior modifying rules stored in the semantic format rules database for the policy engine.

5. The system of claim 4, wherein the parser is further for providing information to the policy engine on what action to take after the parser parses the semantic format software component behavior modifying rules stored in the semantic format rules database.

6. The system of claim 4, further comprising a detailed action rules database linked to both the semantic format parser and the policy engine for storing detailed action rules that further define the semantic format software component behavior modifying rules.

7. The system of claim 6, wherein the parser is further for informing the policy engine on what action to take after the parser matches the interface event with one or more of the semantic format software component behavior modifying rules stored in the semantic format rules database, and the semantic format software component behavior modifying rules stored in the semantic format rules database with the detailed action rules stored in the detailed action rules database.

8. The system of claim 6, wherein the detailed action rules define specific atomic actions to be taken by the adaptor and the interceptor in connection with the semantic format software component behavior modifying rules parsed by the parser.

9. The system of claim 8, wherein the semantic format rules database is reconfigurable to modify the detailed action rules and therefore the interface event.

10. The system of claim 8, wherein the detailed action rules database is reconfigurable to modify the semantic format rules and therefore the interface event.

11. The system of claim 6, wherein the detailed action rules database is located externally from the policy based software component.

12. The system of claim 6, wherein the detailed action rules database is located within the policy based software component.

13. The system of claim 3, wherein the semantic format rules database is located in a directory mediated by a common information model.

14. The system of claim 13, wherein the common information model is located externally from the policy based software component.

15. The system of claim 13, wherein the common information model is located within the policy based software component.

16. The system of claim 1, wherein the rules database is located externally from the policy based software component.

17. The system of claim 1, wherein the rules database is located within the policy based software component.

18. The system of claim 1, wherein the policy rules comprise at least one of application policy rules, field policy rules, service provider policy rules and end user policy rules.

19. The system of claim 1, wherein the interceptor, the adaptor and the policy engine are located within the policy based software component.

* * * * *